June 17, 1924.

G. E. CARTER 1,498,231

METHOD OF MAKING CASTELLATED NUTS

Filed Oct. 26, 1918 2 Sheets-Sheet 1

Inventor:
G. E. Carter

June 17, 1924.

G. E. CARTER

METHOD OF MAKING CASTELLATED NUTS

Filed Oct. 26, 1918     2 Sheets-Sheet 2

1,498,231

Inventor,
G. E. Carter.
C. C. Shepherd.
attorney.

Patented June 17, 1924.

1,498,231

UNITED STATES PATENT OFFICE.

GEORGE E. CARTER, OF CIRCLEVILLE, OHIO, ASSIGNOR TO THE EASTERN ENGINEERING CORPORATION, OF COLUMBUS, OHIO, A CORPORATION OF DELAWARE.

METHOD OF MAKING CASTELLATED NUTS.

Application filed October 26, 1918. Serial No. 260,610.

*To all whom it may concern:*

Be it known that I, GEORGE E. CARTER, a citizen of the United States, and a resident of Circleville, in the county of Pickaway and State of Ohio, have invented certain new and useful Improvements in Methods of Making Castellated Nuts, of which the following is a description.

My invention is an improvement in the present method of cutting slots in castellated nuts, and has for its object to provide a method of the character specified by means of which the grooves, slots, or notches, hereafter referred to as sector slots, may be cut in the nuts with a minimum of handling, and with the least expenditure of time.

Castellated or castle nuts, as is well known, have slots or grooves in their upper faces for receiving a cotter pin or the like to lock the nut in place. By my methods these slots are cut by one or more cylindric cutters having a number of cutting teeth in the form of hollow end milling cutters, a series or number of nuts being locked in a jig, or frame or other device, hereinafter called a jig, which is so shifted in any suitable or desired manner with respect to the cutters, that in four positions of the jig, or of the cutters, six double sector slots are formed in each nut, the said sector slots being flared at their inner ends to facilitate the insertion of the cotter pin.

Figure 1:
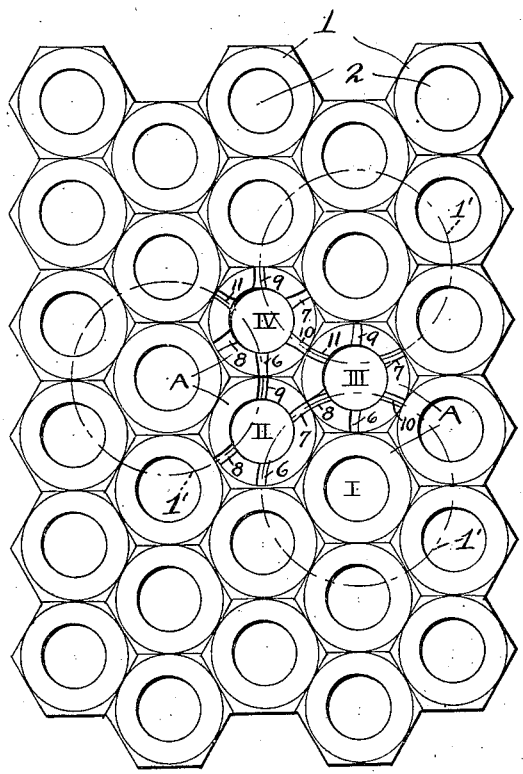
Fig. 1 is a diagrammatic view showing one method of cutting the sector slots.

Referring to Fig. 1 there is shown a series of nuts 1 of hexagonal form, each having a central opening 2, and these nuts are locked in a suitable jig (not shown). A single or multiple spindle drill or machine is used for cutting the sector slots, and the milling cutters 1' shown in Fig. 2 have each a central cone-pointed stud 4, which is adapted to engage the openings 2 of the nuts to center and steady the cutter, while making the cut, with respect to the adjoining nuts.

Figure 2:
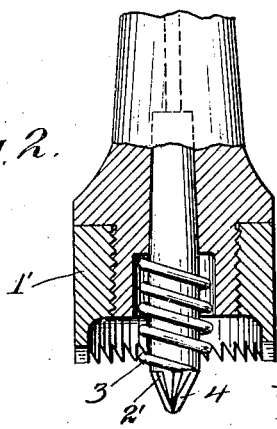
Fig. 2 is a sectional view of one form of cutting tool used in my method.

The cutters 1' Fig. 2 are each provided with a compression spring, seated around the stud 4, the use of which is to prevent any loose nuts in the jig from being lifted up by the stud 4. The stud 4 is provided with flutes 2' to remove any burs that may be in the opening 2 of the nut.

In practice the spindle arms of the multiple spindle machine will be mounted in such a manner that the spindles may be moved laterally within limits to permit the studs 4 of the milling cutters to engage the openings 2 of the nuts, regardless of slight irregularities in the nuts. As shown in Figure 2, the stud 4 is cone pointed, so that it will center itself automatically in the openings or bores of the nuts. In Figure 1 three cutters 1' are shown, and these cutters form the sector slots, which may be six in number, each slot being so formed that its side walls will be on different radii, so that the inner extremities of the slots will be appreciably wider than the outer limits thereof, a feature which is decidedly advantageous in positioning cotter pins or the like within the slots. As will be further understood, the relative arrangement of the nuts and cutters is such that each nut will be moved three times from its original or first position, four positions altogether to complete the slotting of each nut.

In Figure 1 the position of each cutter 1' is such as to enable its stud 4 to engage with one of the nuts in the jig, and the four positions of a nut from the initial position to the completion of the cutting of the sector slots are indicated by the characters I, II, III, IV. In position I any particular nut is engaged by the stud 4 of a cutter 1', and the six nuts in contact with this particular nut, indicated at A in Figure 1, have sector slots cut on their upper faces, the said sector slots being curved, as shown.

The jig is then moved so that the nut A will occupy the position II, that is, with the axis of its opening 2 at the intersection of the lines connecting the axes of four cutters. In position II four single sector slots are cut in the nut A, the said sector slots being indicated at 6, 7, 8, and 9 respectively.

The jig is now moved to bring the nut A to position III, that is, with its axis at the center of the line connecting the two cutters at the right of Fig. 1. Here two more single sector slots 10 and 11 are cut, and sector slots 7 and 8 receive the second cut making them complete. The jig is now moved to bring the nut A to position IV and the remaining sector slots 8, 9, 10 and 11 receive the second or completing cut. This completes the sector slotting of the nut A, and likewise of any other nut in the jig except those in the outer edge of the jig. Referring to Fig. 1 it will be seen that each of the sector slots 6, 7, 8, 9, 10 and 11 are flared at the inner end, that is, at the opening 2, and that each of the sector slots is in diametrical alignment with another sector slot.

The flaring of the sector slots facilitates the insertion of the cotter pin. Thus but four positions of the jig are necessary to complete the nuts, it being understood that as many cutters may be used as may be necessary to cut all the nuts in the jig by three movements, or by four positions described.

The number of nuts that may be completed at the same time will depend upon the number of nuts locked in the jig and the number of cutters employed. The nuts are locked in the jig in somewhat the same manner that type are locked in a chase, and while four operations are necessary for cutting all the nuts, each nut is beneath the cutting edge of the cutters but three times.

The foregoing describes only one series of movements whereby the jig advances thirty degrees to the left, then thirty degrees to the right, and then thirty degrees to the left, in which each nut in turn receives the stud 4 of a cutter 1' and becomes the center of a group of seven nuts. In the four cutting operations each nut receives the six double cuts or sector slots, except the outside nuts around the border of the jig which obviously have to be specially treated owing to their marginal positions.

It is obvious that any other arrangement or movements will serve the same purpose equally well, provided each nut at some time during the process receives the stud 4, and is three times under the cutting edge, except the border nuts which may be again locked in the jig in such position as to receive the cuts necessary for completion, or the jig can be made with holes in its border corresponding to the size of the opening 2 in the nuts, to receive the stud 4, and allow the tools to complete every nut in the jig by said three movements. While the castellating of hexagon nuts is especially referred to, it will be obvious that square or other shaped nuts may be so cut with circular or sector slots.

The sector slots or grooves are double sector form. It is obvious that by using cutting tools of various sizes other combinations of sector slots or grooves may be provided, as, for instance, twelve slots may be made in the nuts with the same procedure that is used in cutting six double sector slots, by using a tool of sufficient diameter. These sector slots, however, will not be flaring, but will have slightly curved side walls.

For double sector slotting, the cutters must be arranged in space relation a distance from each other corresponding to twice the distance between opposite faces of a nut, and the cutters must have a radius slightly less than the distance between the opposite faces of the nut, and the jig must be moved at each movement a distance corresponding to the distance between the opposite faces of a nut, and at an angle of thirty degrees.

Figure 3:
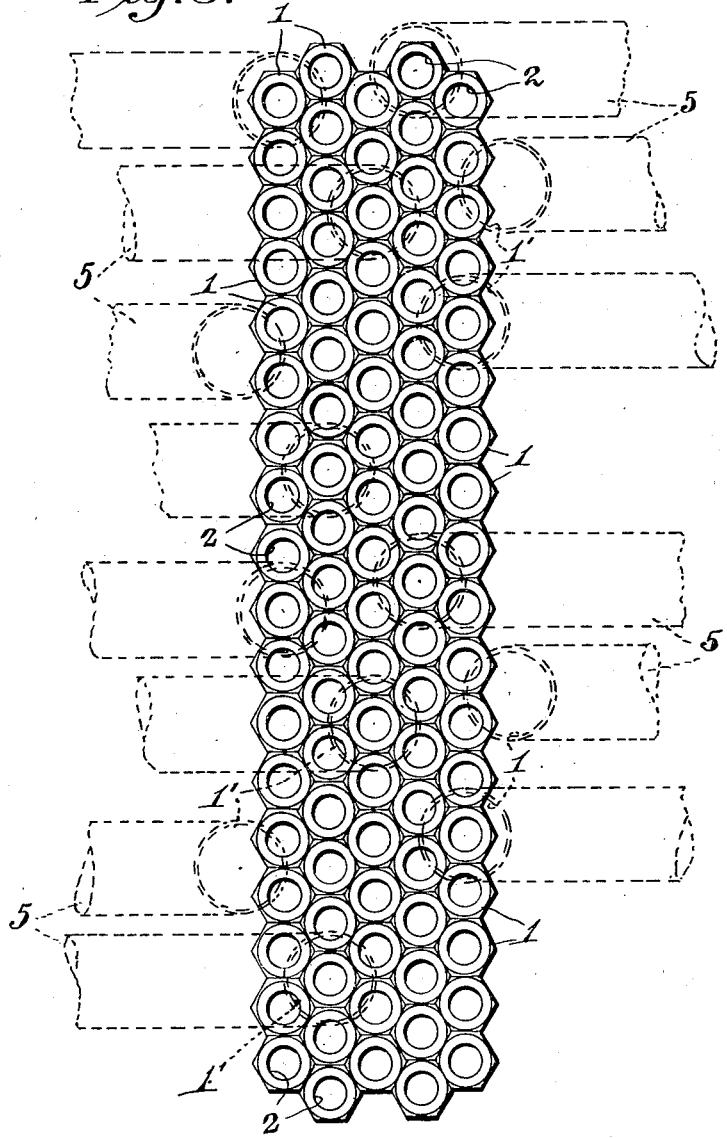
Fig. 3 is a diagrammatic view showing a method where two sections of a machine are employed to cut the sector slots.

In Fig. 3 I have shown two sections of 7 cutters 1' each, being employed to cut the sector slots. The cutters in all sections will operate simultaneously, and the jig (not shown) employed to hold the nuts, will advance a distance corresponding to the distance from the center of one nut opening 2 to the center of an adjacent nut opening, and in a plane at right angles to the axis of the cutting tool, and at right angles to the axis of a nut. This operation will be repeated nine consecutive times, which will complete all the nuts embraced within the two sections of cutters, or a distance corresponding to the distance from the center of one nut opening 2 to the center of the tenth nut opening, and the operation will be repeated as before. At each simultaneous operation of the cutters, an average of ten nuts are sector slotted.

The jig will be provided with holes in its outer border to correspond with the nut opening 2, to receive the stud 4 of the cutter 1'. The spindle arms 5 are to be operated by multiple spindle drilling machines, and the spindle arms 5 are to be arranged so that each nut in each of the five rows, at some time will receive the stud 4 of the cutting tool 1'.

It is obvious that five cutting tools will sector slot 3 rows of nuts, or three cutting tools will sector slot 1 row of nuts, and that as many sections of cutting tools as may be desired can be operated simultaneously as the limit of the multiple spindle drilling machine will permit.

It will be noticed that my invention contemplates in a broad sense the grouping of a number or series of nuts in a predetermined relation, wherein each bears a similar relation to the adjoining one, grouping a series of cylindric milling cutters in a relation similar to that of the nuts, operating the said cutters to work upon a certain series of said nuts, then moving one of the said series relative to the other in a plane parallel to the faces of the nuts, or in a plane thirty degrees from parallel to the faces of the nuts, a distance proportionate to the size of said nuts, and subsequently operating said cutters to produce a further series of cuts in a fixed relation to the first series of cuts made upon the said nuts.

I claim:

1. A method of castellating nuts, which consists in locking together in a jig a series of nuts, and in subjecting them in succession to the action of cylindric milling tools arranged with their axes in parallel lines, and in relatively shifting the jig and tools in zigzag fashion to produce a further series of cuts.

2. A method of castellating nuts which consists in locking together in a jig a number of nuts, and in subjecting them in succession to the action of a plurality of cylindric milling tools arranged with their axes in parallel lines and their centers spaced apart from each other a distance corresponding to twice the distance between the opposite faces of a nut, and in shifting the jig angularly a distance corresponding to the distance between the opposite faces of a nut, to bring the nuts in succession beneath the cutters, each of said cutters having a radius practically equal to half the diagonal of a nut plus half the length of one face of the nut.

3. A method of castellating nuts which consists in locking together a number of nuts in a jig and in subjecting them in succession to the action of a number of cylindric milling tools arranged with their axes in parallel lines and spaced apart from each other a distance corresponding to twice the distance between the opposite faces of a nut, and in angularly shifting the jig a distance corresponding to the distance between the opposite faces of a nut, to bring the nuts beneath the cutters.

4. A method of castellating nuts, which consists in arranging a predetermined number of rows of nuts, and a predetermined series of nuts, and in subjecting them in succession to the action of a predetermined number of cylindric milling tools, arranged in a relation to correspond with the series of nuts, and operating each series of milling tools simultaneously, and in shifting the jig after each simultaneous cut of the tools, a distance corresponding to the distance from the center of one nut opening to the center of the adjacent nut opening, and at right angles to the face of a nut, and at right angles to the axis of the cutting tool.

5. The herein described method which consists in grouping a series of nuts in a predetermined relation, wherein each nut or series of nuts, bears a similar relation to the adjacent one, grouping a series of cylindric milling cutters in a similar relation to that of the nuts, operating the said cylindric milling cutters to work upon a certain series of said parts, then moving one of said series relative to the other in a plane at right angle to the faces of the nuts, a distance proportionate to the size of said nuts, and subsequently operating said cylindric milling cutters to produce a further series of slots in a fixed relation to the first series made upon the said parts, as for the purpose set forth.

6. The method of castellating a nut consisting in subjecting the nut in different positions axially to the action of a cutter moving in a path curved in a plane parallel to the plane of the top of the nut to form flared castellating slots on said top.

7. The method of producing castellated nuts, which consists in locking together a series of nuts in parallel adjacent rows, and in subjecting these nuts successively to the action of a cylindric cutter, by relatively shifting the cutter and nuts in a zigzag manner to produce a series of cuts in the upper faces of the nuts.

GEO. E. CARTER.